United States Patent

[11] 3,610,440

[72] Inventors Jerry W. Welker;
Donald M. Grey, both of Selma, Calif.
[21] Appl. No. 828,865
[22] Filed May 29, 1969
[45] Patented Oct. 5, 1971
[73] Assignee Sperry Rand Corporation
New Holland, Pa.

[54] SHUTTLE LATCH FOR THE TRANSFER TABLE BALE HOOKS ON A BALE WAGON
14 Claims, 9 Drawing Figs.
[52] U.S. Cl............................................... 214/6 B, 214/8.5 R
[51] Int. Cl............................................... B65g 60/00, B65g 59/08
[50] Field of Search............................................... 214/6 B, 518, 519, 520, 522, 8.5 B, 8.5 A, 8.5 F

[56] References Cited
UNITED STATES PATENTS
3,385,456   5/1968   Snider........................... 214/6 B
3,448,879   6/1969   Van Der Laly................ 214/522
3,490,613   1/1970   Eggenmuller et al......... 214/6 B
3,510,013   5/1970   Best............................... 214/6 B
3,515,291   6/1970   Grey et al...................... 214/6 B
3,502,230   3/1970   Grey et al...................... 214/6 B Primary Examiner—Gerald M. Forlenza
Assistant Examiner—Robert J. Spar
Attorneys—Joseph A. Brown, John C. Thompson, James J. Kennedy and George C. Bower ABSTRACT: A bale wagon adapted to unload successive bale tiers therefrom one bale at a time having a transfer table which supports the bale tiers during the tier formation and discharge, a cross conveyor for discharging the bales, bale hooks pivotally mounted with respect to the transfer table to engage and separate bales disposed on the transfer table to facilitate unloading, and a shuttle member engageable with the cross conveyor and actuated by movement thereof and operably connected to the bale hooks to cause movement thereof between bale engaging and retracted positions in response to movement of the conveyor.

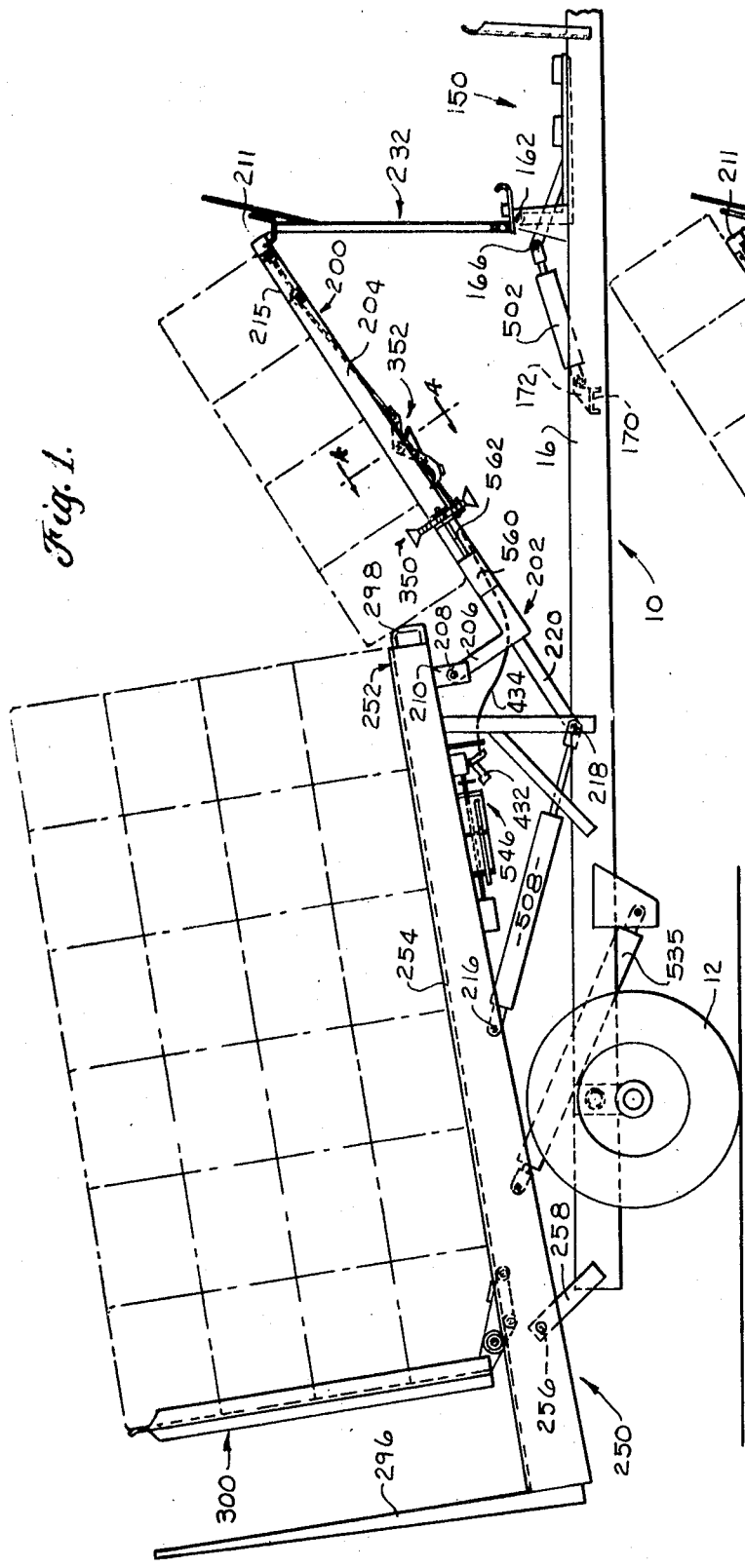
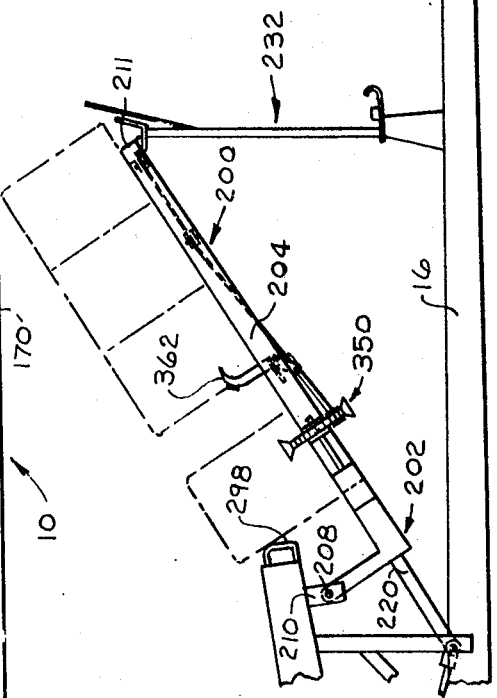

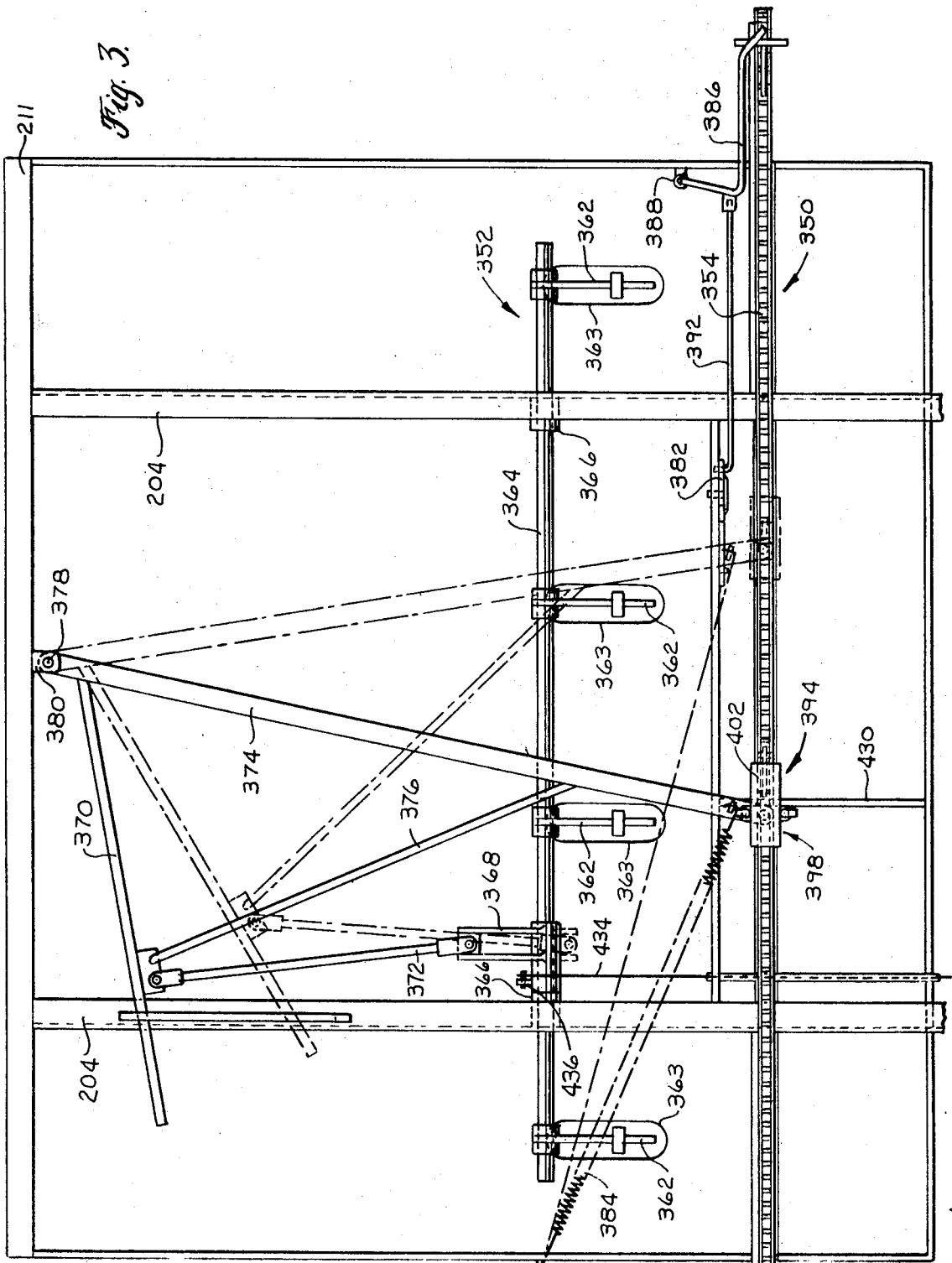

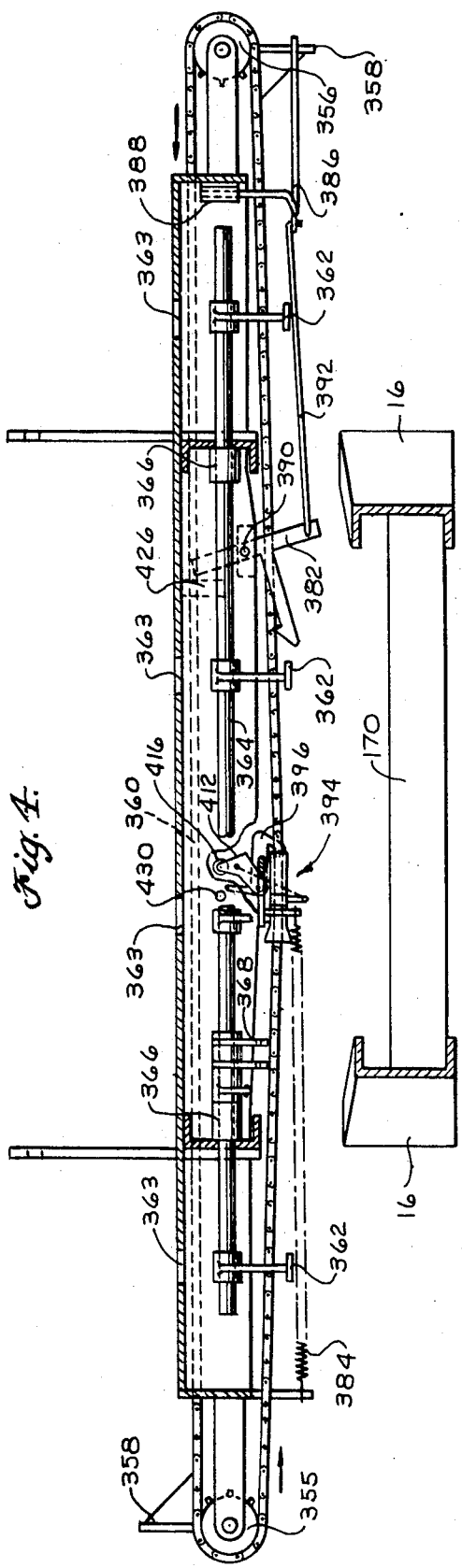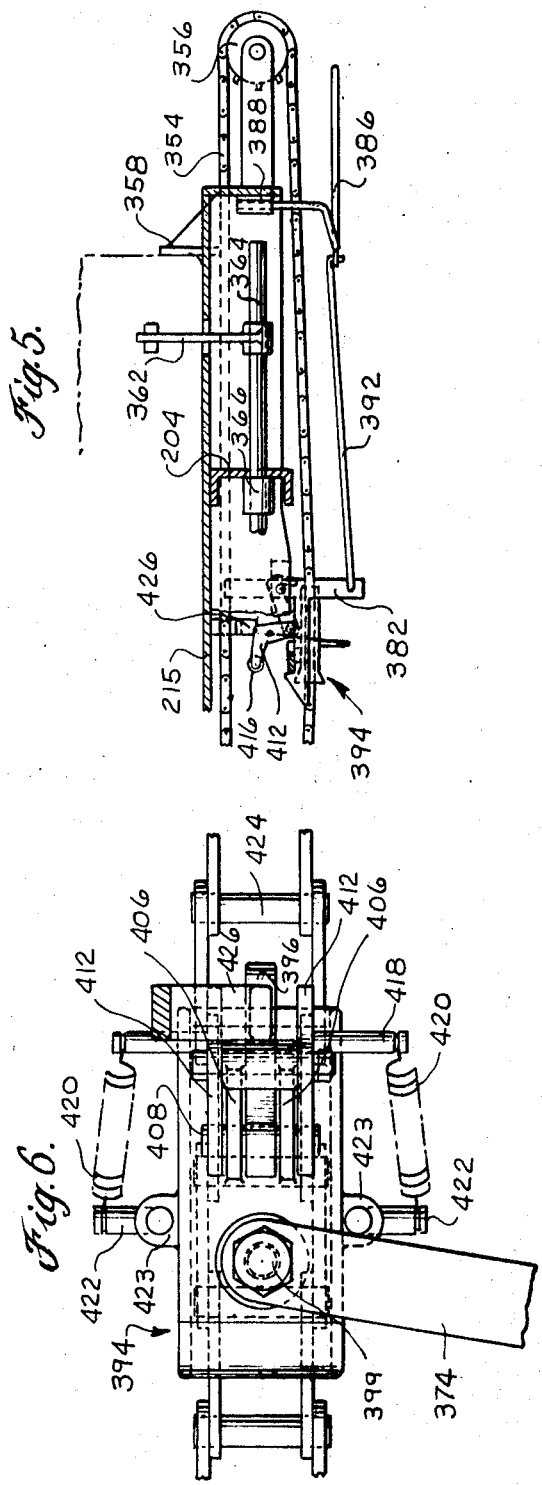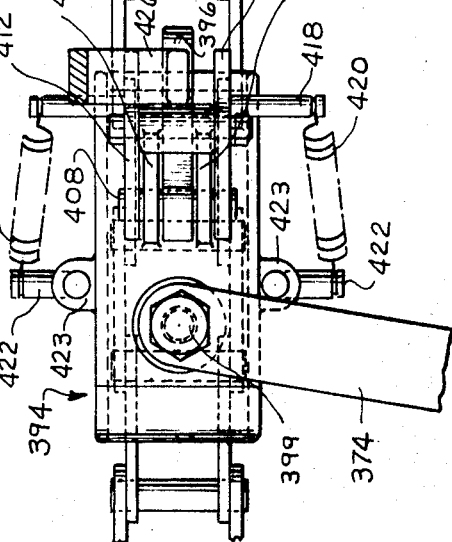

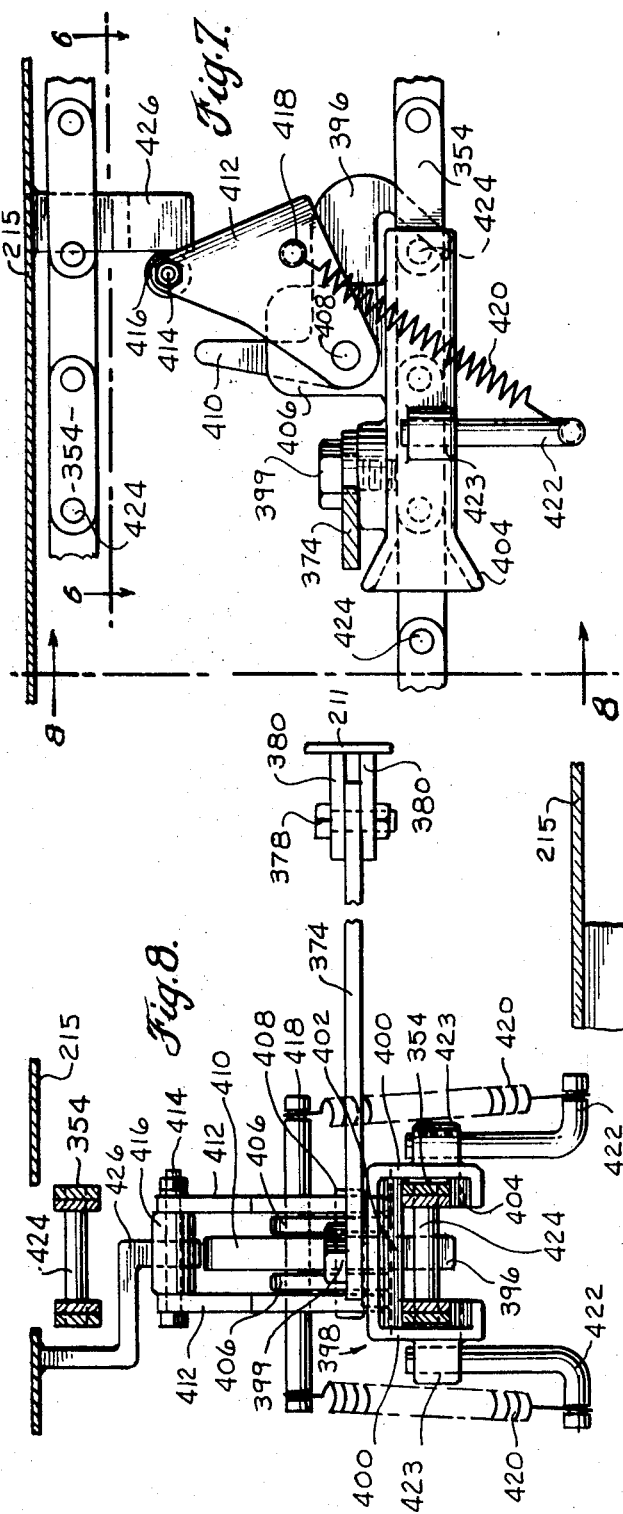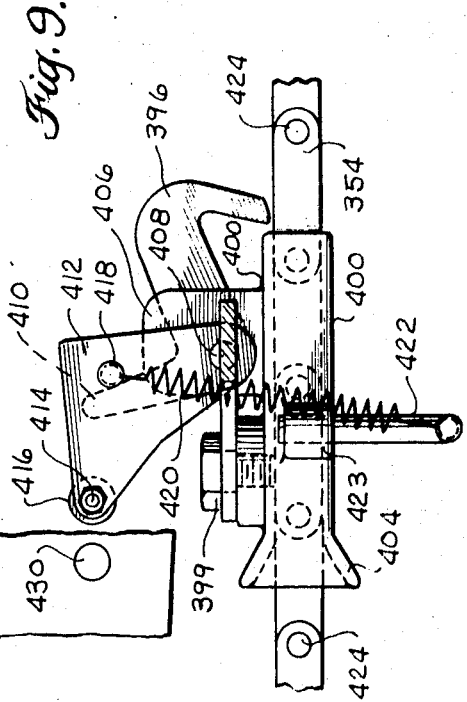

SHUTTLE LATCH FOR THE TRANSFER TABLE BALE HOOKS ON A BALE WAGON

BACKGROUND OF THE INVENTION

This application relates generally to bale-handling wagons and specifically to a bale wagon which is capable of unloading hay bales from the wagon one bale at a time.

With the introduction of the automatic bale-handling wagon, of the type shown and described in application Ser. No. 755,141, filed Aug. 26, 1968, now Pat. No. 3,502,230 it was necessary to provide some means which could be used in conjunction with the second, or transfer table, to adapt the wagon to unload bales one bale at a time, in addition to being able to automatically form a composite stack on the wagon and deposit the entire stack on the ground, as shown by U.S. Pat. No. 2,848,127, issued to Grey on Aug. 19, 1958. If the transfer table was to be used both as a tier-forming support and tier-discharging support, then it was necessary to separate the upper bales in the tier placed on the table during the discharge operation from the lower bales which were to be discharged so as to assure that the bales would be discharged one bale at a time. The discharge means and the bale engaging and separating means had to be synchronized to operate together in a simple but expeditious manner to assure that the complete bale tier was discharged one bale at a time without interfering with each other.

The transfer table, made well known by the Grey Patent (cited hereinbefore), was not adapted to function as a support means from which the wagon could be either loaded or unloaded. The Grey-type wagon was adapted only to form a composite stack of bales by accumulating individual bale tiers on the transfer table and subsequently placing them on the load bed. A so called second generation wagon, of the type hereinafter to be described, however, is adapted to do not only what the Grey wagon could do, but in addition, it is capable of single-bale unloading the bales from the transfer table. To accomplish this, the transfer table was redesigned to accommodate a cross conveyor, adaptable as a discharge means, which would move two bales at a time transversely across the transfer table to the edge where they are discharged from the table one bale at a time. When the transfer table is supporting a bale tier for discharge, the bottom two bales of the tier will be removed first. However, it is necessary, in order to assure even flow of the bales from the wagon, to separate the upper bales of the tier from the bottom most bales so that the conveyor can move them. The separation should last long enough to permit the last of the two bottom bales to be removed from the table, then permitting the remaining bales to slide down the inclined table so that the next two bales are discharged. Once the next two bales are ready to be moved by the conveyor, the remaining upper bales again need to be separated from the lower bales. This process must be repeated until all the bales of each bale tier are discharged from the wagon.

SUMMARY OF THE INVENTION

Accordingly, the primary object of the present invention is to provide means to facilitate the unloading of a bale wagon one bale at a time from the transfer table which will provide synchronous operation of the discharge means and the bale engaging and separating means.

Another object of the invention is to provide a mechanism which is engageable with the discharge means and operatively connected to the bale engaging and separating means to cause actuation of the bale-engaging means.

Another object of the present invention is to provide a mechanism which is capable of assuming two operable positions which will in turn cause the bale-engaging means to be moved from a first operative position to a second operative position.

A further object of the invention is to provide a means to actuate the bale-engaging means which is operable in response to movement of the discharge means.

Other objects of the present invention will become apparent from the complete description found within the specification and the appended claims.

BRIEF DESCRIPTION OF THE DRAWINGS

FIG. 1 is a side elevational view with the transfer table in its inclined position for single bale unloading;

FIG. 2 is a fragmentary side elevational view showing the bale hooks in the position for engaging and separating the upper bales from the lowermost bales being unloaded;

FIG. 3 shows the underside of the transfer table illustrating the shuttle and the associated mechanism for actuating the bale hooks;

FIG. 4 is an enlarged cross-sectional view taken on the line 4—4 of FIG. 1;

FIG. 5 is a fragmentary cross-sectional view similar to FIG. 4, but showing the shuttle advanced to the position of latching the bale hook-actuating lever in its position of raising the bale hooks and also showing the chain hook released and the chain lug advanced to engage the bale indicated in dot-dash lines; and FIG. 6 is a plan view of the shuttle taken as indicated by the arrows 6—6 in FIG. 7;

FIG. 7 is a side view of the shuttle in its position in which the chain hook will be released from the chain as the shuttle moves to its furthest right hand position as viewed in the figure;

FIG. 8 is a sectional view taken on the line 8—8 of FIG. 7; and

FIG. 9 is a side view showing the chain hook in its released position with the shuttle moving to its furthest left hand position as viewed in the figure.

DESCRIPTION OF THE PREFERRED EMBODIMENT

Referring now specifically to FIG. 1, a bale wagon 10 having a chassis structure comprised of a pair of fore-and-aft extending beams 16, only one of which is shown in FIG. 1, is provided with a pair of wheels 12 only one being shown, which adapt the chassis structure to move over the ground.

A receiving table, indicated generally by the numeral 150, is disposed at the forward end of the chassis structure and is pivotally mounted about point 162 with respect to said chassis structure by means of hydraulic cylinder 502 which is pivotally connected at 166 to the receiving table and fixed to bracket 172 which is mounted on transverse frame members 70. As is well known in the art, a bale pickup means, not shown, directs bales from the field to the receiving table where they are accumulated and then placed on the transfer table 200 disposed in a normally horizontal position, not shown, immediately behind the receiving table 150.

The transfer table 200 is comprised in part of an L-shaped structure 202, having a forwardly extending leg 204 and a rearward upwardly extending leg 206. The legs 204 and 206 are disposed at right angles to each other. The table 200 is pivotally mounted with respect to the chassis structure being pivotal about pins 208 which are mounted in depending lugs 210, only one of each being shown. The forward end of the table is provided with a transverse beam member 211 and the bed forms a support means for bales having an upper surface 215. The transfer table is pivoted upon actuation of hydraulic cylinder 508 which is pivotally connected to a load bed 250 at 216 and by the other end pivotally connected at 218 to rearwardly extending member 220, which is, in turn, fixed to the L-shaped member 202. When the second, or transfer table is disposed in the single bale-unloading position, the inclined position shown in FIGS. 1 and 2, the table is held in that position by support member 232 shown in FIGS. 1 and 2.

The load bed, or load rack 250 is also mounted on the chassis structure in the normally inclined position shown in FIG. 1. The bed 250 has a forward end portion 252 and forms a support surface 254. The entire load bed is also pivotal with respect to the chassis by pin 256 to rearwardly and upwardly extending brackets 258 which are fixed by any suitable means to the longitudinally extending frame members 16. A pair of upright fork members 296 are fixed to the rear of the load bed and a box beam 298 is fastened to the forward end 252 of the load bed 250 to provide a suitable bearing surface for bales being single bale unloaded as will hereinafter be described in detail. A rolling rack 300 is adapted to travel in a fore-and-aft direction along the load bed 250 to support successive bale tiers as they are transferred to the load bed from the transfer bed 200. While not shown, the load rack is power driven in both directions so that it will move rearwardly as the wagon is filled and can be moved forwardly as the wagon is being unloaded one bale at a time.

More complete descriptions of the elements hereinbefore described may be found in copending application Ser. No. 755,141, filed Aug. 26, 1968. Since these particular elements form no part of the present invention a detailed description of their structure and operation have not been included, except as to give a general overall operation of the bale wagon.

Referring now to FIGS. 1-4 which will show the transfer bed and its various components and mechanisms in greater detail. It will be seen that a cross conveyor 350 forms a bale-discharging means by which bales may be discharged from transfer table one bale at a time. Bale engaging means 352 are also provided on the transfer table and are adapted to be operated between a retracted position and a bale engaging and separating position so as to separate the upper bales of a tier of bales placed on the transfer bed from the lowermost bales on the bed, as shown in FIG. 2 of the drawings. The bale discharging cross conveyor 350 is comprised of an endless conveyor chain 354 which rides over sprockets 355 and 356. The sprockets 355 and 356 extend outwardly from the side of the transfer table, as shown in FIG. 4, and are mounted for rotation with respect to the table and in spaced-apart relation therefrom. The sprocket 355 is driven by means of a motor 560 through a drive shaft 562. Sprocket 356 forms an idler sprocket over which the conveyor chain is driven. The chain is provided with a pair of paddle members 358 which are fixed to the chain and extend upwardly therefrom. The paddles 358 are so disposed on the chain that the distance between the paddles is equal.

The conveyor chain 354 is adapted to ride in a groove 360 which is provided in the surface 215 of the transfer table 200. In this manner, the actual chain of the conveyor is disposed slightly below the surface of the transfer table, only the paddles, which extend upwardly from the chain, being disposed above the surface 215.

The bale-engaging means 352 is comprised of a plurality of bale hook members 362 which are pivotally mounted with respect to the transfer table and are adapted to extend upwardly through the table and retract beneath the table through suitable openings 363. Each of the bale hooks 362 are mounted in spaced-apart relation on rockshaft 364. The rockshaft is mounted beneath the surface 215 of the transfer table for rotation with respect thereto, the rockshaft being disposed in bushings 366. A rock arm 368 is securely fastened to the rockshaft, by any suitable means, not shown, and the rock arm is, in turn, suitably operatively connected through a linkage mechanism to a rock lever 370. A link 372 extends between the rock arm 368 and the rock lever 370 and is pivotally connected by each end thereto, as shown in FIG. 3. The rock lever 370 is fixedly secured by any suitable means at one end thereof to a swingable arm 374. A brace 376 extends between rock lever 370 and the arm 374 to form a more rigid link mechanism. Swingable arm 374 is pivotally connected with respect to the transfer bed means by means of a pivot pin 378 which extends through a pair of spaced-apart lugs 380 and the swingable arm 374, as shown in detail in FIGS. 3 and 8 of the drawings. The rearwardly extending lugs 380 are, in turn, mounted to the transverse frame member 211 of the transfer bed. When the arm 374 is moved to the left side of the apparatus from the full line shown in FIG. 3, to the broken line position, the lever 370 will move rearwardly causing the rockshaft 364 to rotate in a clockwise direction (when viewed from the right) raising the hooks 362 into engagement with the bales. As the rockshaft continues rotation the layers of bales above that layer which is to be discharged will be shifted upwardly and forwardly to the position indicated in FIG. 2. When the swingable arm 374 swings from the broken line position to the full line position of FIG. 3, the hooks will again be retracted and the bales held by the hooks will drop by gravity until the lowermost bales contact the edge of channel member 298, as shown in FIGS. 1 and 2.

The swingable arm 374 will be moved from the full line position to the dot-dash line position illustrated in the drawings by the conveyor, the arm being held in the broken line position by a latch mechanism 382. Upon release of the latch mechanism 382, best shown in FIGS. 3-5, the swingable arm will be rotated to the full line position by means of a spring 384. The latch 382 is actuated, or tripped, by the action of the paddles 358 as they contact the trip arm 386. When the arm 386 is contacted it will pivot within the apertured lug 388, causing the latch 382 to swing away from the arm 374 about pivot 390 by the action of the link 392 which interconnects the latch 382 and the trip arm 386.

At one end of the swingable arm 374 is a conveyor engaging assembly 394. The conveyor engaging assembly is comprised of a hook member 396 which is caused to be swung in engagement with the conveyor chain when the arm 376 attains its full line position shown in FIG. 3, the hook being swung out of engagement with the conveyor chain when the arm 376 attains its broken line position shown in FIG. 3. Conveyor engaging assembly also includes a shuttle 398 which is slidably engageable with the conveyor chain 354. Shuttle 398 is comprised of front and rear side portions 400 and an interconnecting bite portion 402 whose lower surface rides upon the upper surface of the lower flight of the conveyor, as illustrated in FIG. 4. The shuttle is also provided with an inwardly directing flange portion 404 along the lower end of the side portions 400. The flange portions are best shown in FIGS. 7-9. A pair of upwardly extending spaced-apart lugs 406 are mounted on the bite portion 402 of the shuttle and a pin 408 is carried thereby. The hook 396 is journaled about the pin 408 and has an upwardly extending end portion 410. A switch means, or hook-actuating assembly, is comprised of a pair of spaced-apart plates 412 which are also journaled about the pin 408. The upper ends of the spaced-apart plates 412 carry a stud assembly 414 about which is journaled a roller member 416. Extending through and to either side of the plates 412 is a pin, or shaft 418 which are connected by their outer ends to L-shaped members 422 by springs 420. The L-shaped members 422 are mounted on either side of the shuttle member side portions 400 being suitably held in collars 423.

In operation, the discharge means 350 and the bale-engaging means 352 function as follows: the sprocket 355 is rotated by motor 560 and the cross conveyor chain is caused to rotate in the direction indicated by the arrows in FIG. 3. Assuming that the paddles are in the position shown in FIG. 3, and the hooks 396 are retracted, with the swingable arm 74 in the position shown by the full line position shown in FIG. 3, movement of the conveyor chain will cause the arm 374 to move from the full line position toward the dot-dash line position shown in FIG. 3. As the shuttle advances to the left side of the machine, the arm 374 will pass over the latch 382. Continued movement to the left will cause the hook 396 to be disengaged from the pintle 424 of the conveyor chain when the roller 416 contacts an abutment member 426 which is carried by the bed means and depends from the lower surface of one of the plates 215. While the shuttle is in the disengaged operative mode, the arm will not return to the full line position since it will be held in place by latch 382 in the manner shown in FIG. 5. When the paddle contacts the trip arm 386, the latch 382 will be released and the arm 374 will be swung toward its full line position. During this movement, the hook 396 will be held from engagement with any of the pintles 424 since switch 412 will have swung to an over center position, that is, that the springs 420 have passed to the other side of the pivot pin 408, the upper end of the hook being in contact with the intermediate portion of pin 418. This relationship is illustrated in FIG. 9 of the drawings. When the arm 374 reaches its full line position, the roller 416 will contact a cross shaft 430, which is secured to the underside of the transfer table in any suitable manner, forcing the switch away from its over center position. The pin 418 will move from engagement with the upper end 410 of the hook 396 to engagement of the lower end. In this position, the hook will be forced downward by the springs 420 until it engages one of the pintles 424 traveling beneath it.

When the machine is being operated in its single bale-unloading mode, the tiers of bales are transferred onto the transfer table only when the paddles 358 are in the position illustrated in FIG. 4. In this position, the bale hooks 362 are disposed below the bale hook openings 363 as the arm 374 has been released by the latch 382 immediately prior to the attainment of the position shown in FIG. 4. As motor 560 starts to rotate the lower flight of the cross conveyor chain 354 will be moved to the left of the machine carrying the conveyor engaging assembly 394 in that direction, in turn, causing the rockshaft 364 to rotate in such a manner that the hooks 362 will be projected upwardly through the slots 363 so that they engage the larger of bales immediately above the lowest layer, the engaged bales then being shifted upwardly to the position indicated in FIG. 2. This shifting movement will take place before the paddle 358 at the left-hand side of the machine will engage the left-hand end of the lowermost layer of bales. Continued rotation of the motor 560 will cause the lowermost layer of bales to be discharged from the transfer table. After the first layer of bales has been discharged, the paddle 358 of the conveyor 354 will contact the trip arm 386 causing latch 382 to be disengaged from the conveyor-engaging assembly, permitting the swingable arm 374 to be swung to the right by action of the spring 384, lowering the hooks beneath the slots on the table to permit the next lowest layer of bales to assume the lowest position. Continued movement of the chain will then cause the hooks to swing upwardly to again engage the next upper layer of bales and the paddle, which has just engaged trip arm 286, to then engage the left-hand end of the bales ready for discharge. After the last layer of bales have been discharged from the tier of bales deposited on the second table, the rolling rack 300 is advanced forwardly to deposit another layer of bales upon the second table for discharge as hereinbefore described.

To insure that the rolling rack cannot be advanced toward the forward end of the bale wagon when the hooks are in their lowered position, a latch 432 associated with control means 546 prevents the motor 560 and the rolling rack 300 from being driven at the same time. The latch 432 holds the control means in its forward position, except when released by control cable 434. The forward end of the control cable 434 is connected to one side of the rockshaft 364 by means of lug 436 which is securely fixed to the rockshaft. The control cable will release the latch only when the rockshaft 364 has been rotated to its full extent in the counterclockwise direction, the hooks being disposed below the surface of the transfer table 200. Once the latch is released, the control means may be operated to shift the conveyor so that it will stop in the position shown in FIG. 4.

While this invention has been described in connection with a single embodiment, it will be understood that this embodiment is capable of modification and that this application is intended to cover any variations, uses, or adaptations following, in general, the principles of the invention and including such departures from the present disclosure as come within the known or customary practice in the art to which the invention pertains, and as fall within the scope of the invention or the limits of the appended claims.

Having thus described my invention, what I claim is:

1. A bale wagon having a chassis structure adapted for movement over the ground, bed means on said chassis structure for forming and discharging successive tiers of bales, means for discharging bale tiers from said bed means one bale at a time, means for engaging and separating bales on said bed means and means cooperable with said discharging means for actuating said bale engaging and separating means, said actuating means comprising means engageable with said discharging means, and link means interconnecting said means engaging said discharge means and said bale-engaging means for actuating said bale-engaging means.

2. A bale wagon, as recited in claim 1, wherein said discharging means comprises conveyor means engageable with bales on said bed means and being driven transversely across said bed means.

3. A bale wagon, as recited in claim 2, wherein said conveyor means includes an endless conveyor chain and a pair of paddle members equally spaced apart on said conveyor chain, said paddles engaging bales on said bed means for discharging said bales one at a time.

4. A bale wagon, as recited in claim 1, wherein said means for engaging and separating bales comprises a plurality of bale hooks pivotally mounted beneath said bed means, for extension and retraction with respect to said bed means, and apertures in said bed means in alignment with said bale hooks, said apertures permitting upward extension of said hooks with respect to said bed means.

5. A bale wagon, as recited in claim 1, wherein a latch means is provided on said bed means and actuated in response to movement of said discharge means and said means engageable with said discharge means comprises a shuttle member having side portions and a connecting bight portion, hook means pivotally mounted with respect to said shuttle and selectively engageable with said discharge means and switch means on said shuttle engageable with said hook means and a member on said bed means having a first operable position for pivoting said hook means out of engagement with said discharging means.

6. A bale wagon, as recited in claim 5, wherein said latch means is selectively engageable with said shuttle member and said switch has a second operable position for pivoting said hook means into engagement with said discharging means.

7. A bale wagon having a chassis structure adapted for movement over the ground, bed means on said chassis structure for forming and discharging successive tiers of bales, means for discharging bale tiers from said bed means one bale at a time, means for engaging and separating bales on said bed means and means cooperable with said discharging means for actuating said bale engaging and separating means, said actuating means including means engageable with said discharging means and operably interconnected with said bale engaging and separating means.

8. A bale wagon, as recited in claim 7, wherein said discharging means comprises an endless conveyor and said means engageable with said discharging means comprises a shuttle member engageable with said conveyor and adapted for movement with said conveyor from a first operative position to a second operative position.

9. A bale wagon, as recited in claim 8, wherein said shuttle member is provided with a hook member pivotally mounted on said shuttle member and selectively engageable with said conveyor for moving said shuttle from said first operative position to said second operative position, and a switch engageable with said hook to place said hook in said first and second operative positions.

10. A bale wagon, as recited in claim 9, wherein a latch means is provided on said bed means and is selectively engageable with said shuttle when said shuttle is in said first operative position, said latch means being actuated by said conveyor to hold said shuttle in said first operative position.

11. A bale wagon having a chassis structure adapted for movement over the ground, bed means on said chassis structure for forming and discharging successive tiers of bales, means for discharging bale tiers from said bed means one bale at a time, means for engaging and separating bales on said bed means, and means cooperable with said discharging means for actuating said bale engaging means, said actuating means comprising means engageable with said discharging means in first and second operative positions for moving said bale engaging and separating means to first and second operative positions.

12. A bale wagon, as recited in claim 11, wherein said bale-discharging means comprises an endless conveyor chain transversely disposed with respect to said bed means, said conveyor having a pair of paddles disposed thereon and equally spaced along said chain.

13. A bale wagon, as recited in claim 12, wherein said bale engaging and separating means comprises a plurality of bale hooks mounted on pivotal rockshaft, said bale hooks being pivotal to a first operative bale-engaging position and a second operative retracted position by movement of said conveyor chain.

14. A bale wagon, as recited in claim 13, wherein said bale hooks are moved to said first and second operative position by said means engageable with said discharging means and linkage means connecting said engageable means to said pivotal rockshaft, said engageable means comprising a shuttle selectively connectable to said conveyor chain to move between first and second operative positions, said link means being pivotally connected to said shuttle, said bed means and said rockshaft whereby said rockshaft and said bale hooks are pivoted as said shuttle moves from one position to the other.